United States Patent [19]

Ryan

[11] 3,860,820
[45] Jan. 14, 1975

[54] FILM THICKNESS MEASURING METHOD AND APPARATUS
[75] Inventor: Daniel J. Ryan, Chester, Pa.
[73] Assignee: FMC Corporation, Philadelphia, Pa.
[22] Filed: May 29, 1973
[21] Appl. No.: 364,884

[52] U.S. Cl. .............................. 250/360, 250/571
[51] Int. Cl. .............................................. G01t 1/16
[58] Field of Search ..... 250/358, 359, 360, 219 TH, 250/571

[56] References Cited
UNITED STATES PATENTS
3,405,267   10/1968   Chope .............................. 250/358

Primary Examiner—James W. Lawrence
Assistant Examiner—Davis L. Willis

[57] ABSTRACT

The disclosed method and apparatus involves the use of a radiation gauge for measuring the transverse thickness profile of a running film. To increase the sensitivity of the gauge to transverse thickness variations and minimize sensitivity to film direction thickness variations, the film is folded upon itself so that a double layer of film is presented to the gauge in such manner that one of the layers has a thin film direction segment and the other layer has a thick film direction segment whereby the gauge effectively continuously senses substantially the same film direction thickness. Also disclosed is a method and apparatus for using one radiation gauge for monitoring the transverse thickness profile of two running films.

8 Claims, 6 Drawing Figures

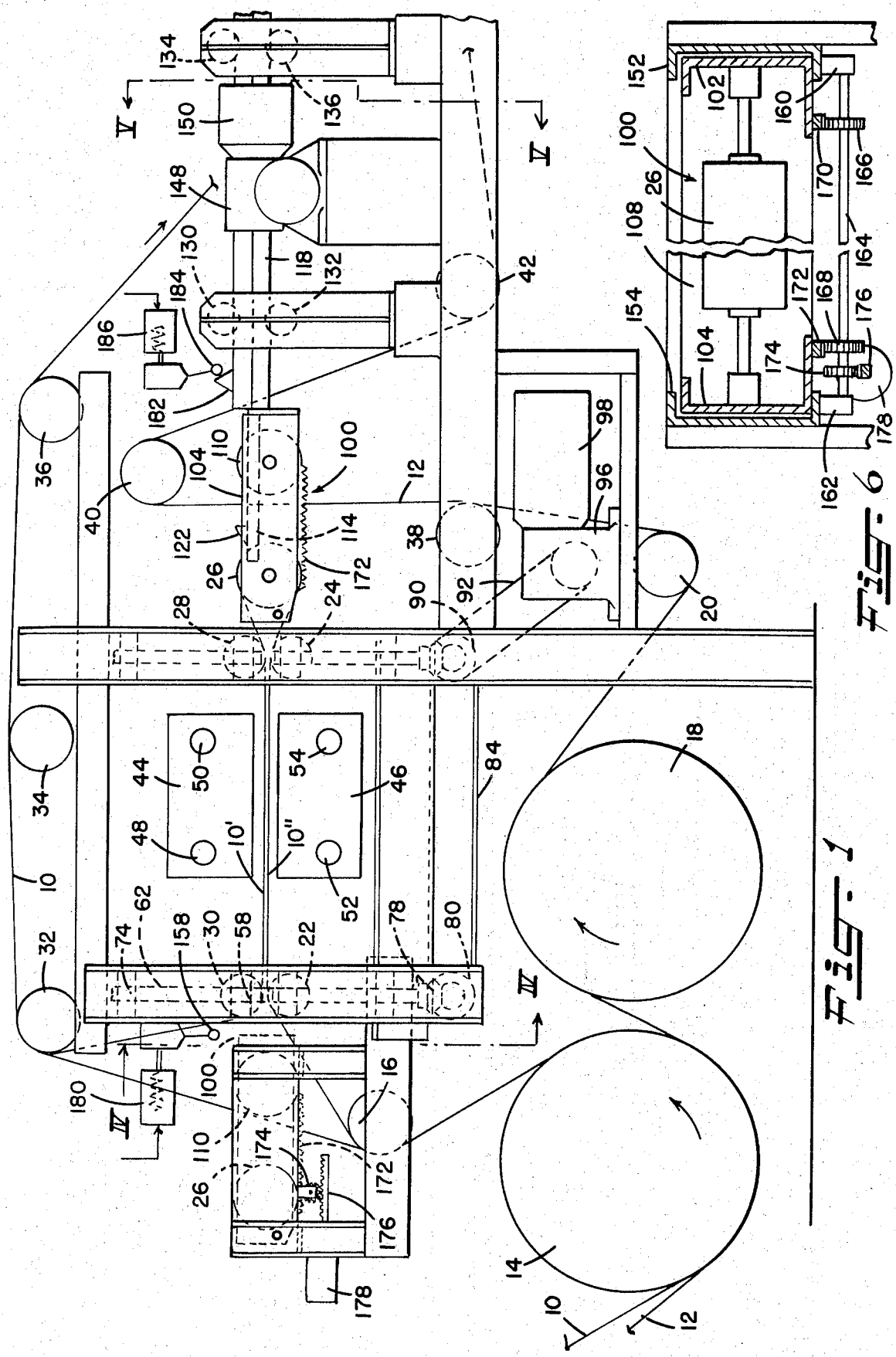

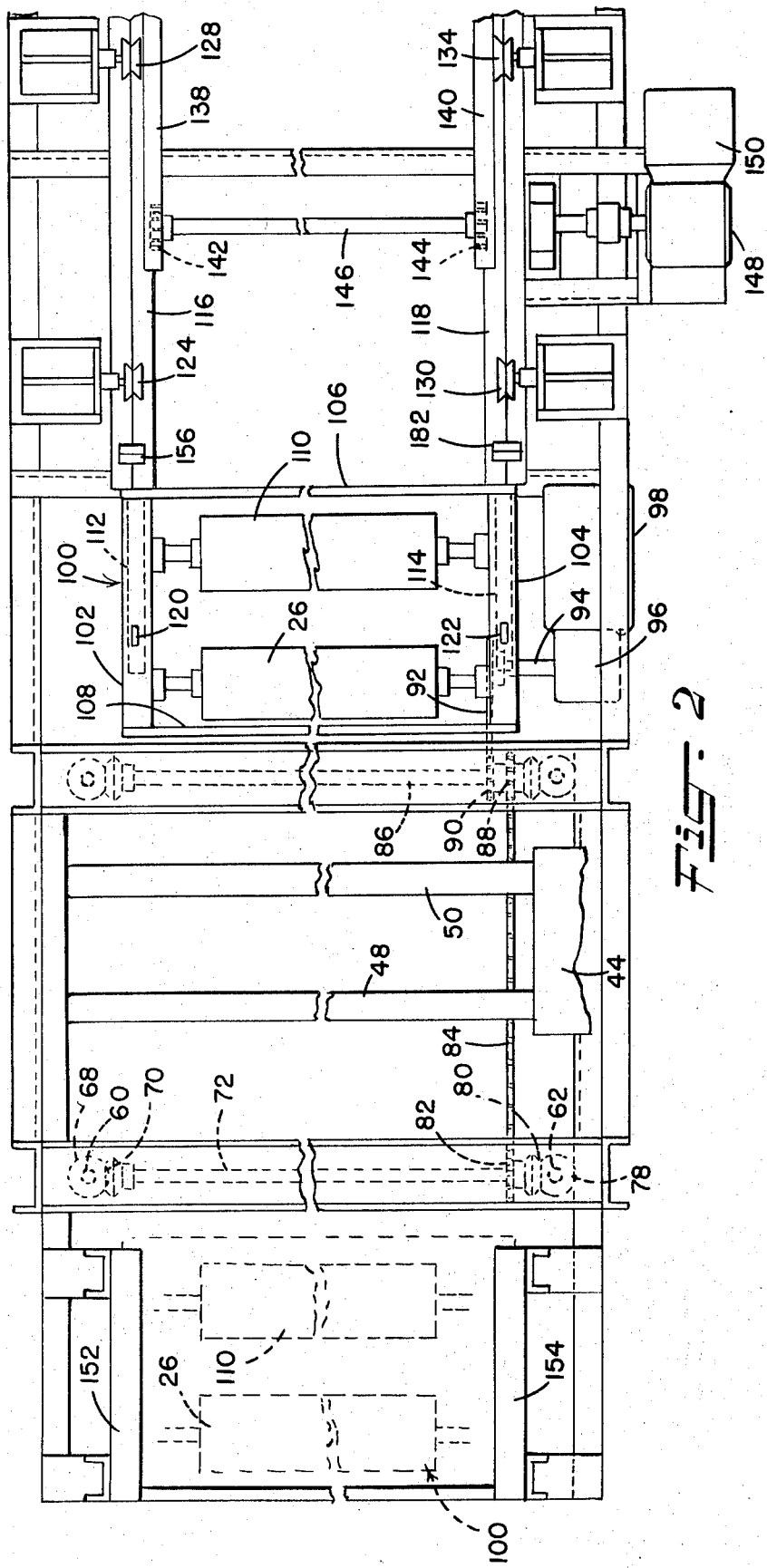

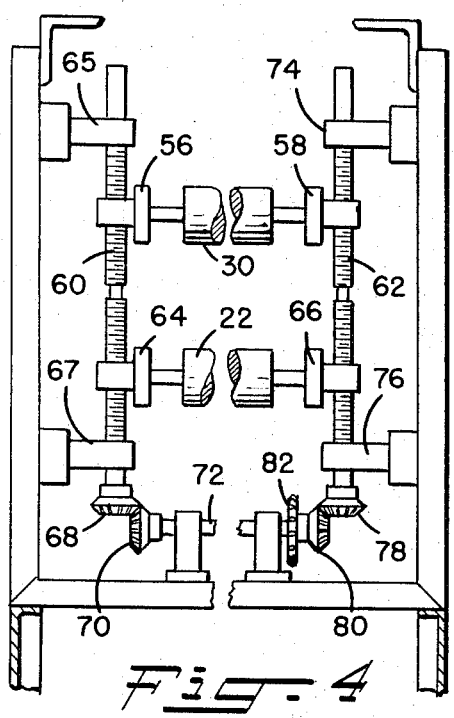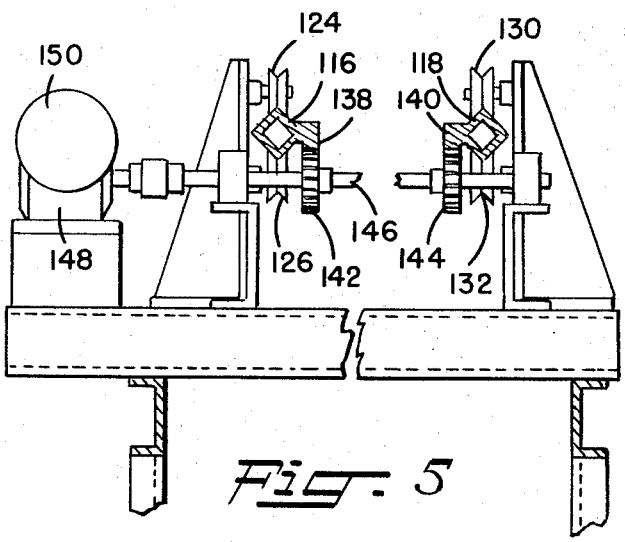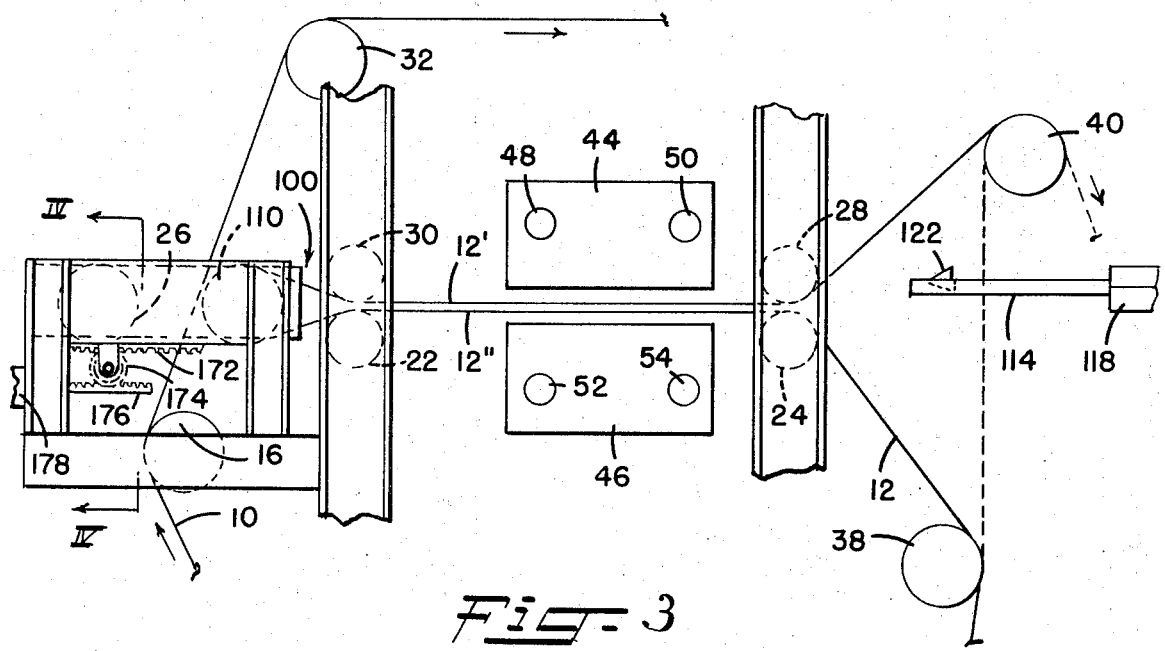

FILM THICKNESS MEASURING METHOD AND APPARATUS

This invention relates to a method of increasing the sensitivity of a gauge for measuring the transverse thickness profile of a running film and to a method and apparatus for selectively directing either of a pair of simultaneously cast and running films through a path traversed by a pair of spaced heads of a radiation gauge whereby one pair of gauge heads may be used for monitoring both films.

The U.S. Pat. to Reichel et al. No. 2,862,245 describes an arrangement for simultaneously forming a pair of regenerated cellulose films by passing newly extruded films in face to face contact (except for periodic separations) through a series of regenerating, washing, desulfurizing, bleaching and softening baths and over a multiplicity of heated drying drums before finally winding them as separate rolls. One of the factors, and the most readily adjustable one, affecting the thickness or gauge of the films is the spread or distance apart of the lips of the nozzles through which the viscose solutions forming the films are extruded. A typical adjustable extrusion nozzle is described in the U.S. Pat. to Nelson, No. 2,923,971. The nozzles should provide an adjustable spacing of the lips even if it is desired to continuously produce the same thickness film. For example, a change in the viscosity of the viscose, or other spinning solution or melt in the case of films other than cellophane, will require an adjustment of the nozzle to maintain the film at the same thickness. Changes in viscosity not only affect the overall thickness of the film but especially cause variation in the transverse thickness profile. Thus, an increase in viscosity will cause less solution to flow through the ends of the nozzles and thereby decrease the thickness of the edges of the film. To correct this, the nozzle is adjusted to increase the spacing of the lips towards the sides of the nozzle. A decrease in viscosity may require that the lips of the nozzle be brought closer together toward the central area of the nozzle in order to maintain the transverse thickness profile uniform. Even though elaborate systems are provided for maintaining the viscosity of the spinning solution constant, the viscosity does in fact vary and it is desirable to make very frequent checks of the final film thickness especially of the transverse thickness profile in order to keep the nozzle adjusted to produce the desired transversely uniform thickness of film.

In addition to transverse thickness variations, films, especially films such as regenerated cellulose which requires numerous treatments between extrusion and wind-up, tend to and in fact do, vary in thickness in the machine direction, that is to say, in longitudinal profile. These longitudinal thickness variations are basically produced by uneven pulling of the freshly extruded film such as caused by a processing roller being unevenly balanced or out of round or by backlash in gears driving the rolls. The variations occur at regualr intervals and usually provide a thinner than desired area caused by a hard pull followed immediately by a thicker than desired area caused by a relaxation of the pull.

For purposes of clarity, it will be here noted that in this specification, the term "transverse thickness" means thickness in transverse profile, that is to say, the thickness variation actually extends as a streak in the machine direction longitudinally of the film. The term "machine direction thickness variations" is used herein to mean variations in longitudinal profile, that is to say, such variations extend across the film at periodic intervals. It is the transverse thickness variations which are the most objectionable since a continuously extending thick streak or thin streak, while not particularly significant in any one small area or cross section of the film, is readily noticeable and highly objectionable when the film is wound into a roll having many thousands of layers. A gauge traversing across a running film notices and records both type of thickness variations and on a chart traced by the gauge the tracings of the machine direction thickness variations normally tend to obscure and make more difficult to read the transverse thickness variations. The present invention provides a method of presenting the film to the gauge in such a way as to eliminate or reduce chart recording of these londitudinal thickness variations.

In the prior art, gauges of various types are used for the measurement of the thickness of various films. For example, X-ray gauges are used for measuring the thickness of steel and other metallic films and sheets. Infra-red ray gauges are used for measuring the thickness of polymer films such as polypropylene and polyethylene. Ultra-violet ray gauges are used for measuring nitrocellulose or polyester films and beta ray gauges are used for measuring the thickness of all films generally except those of a metallic nature. Gauges of this type may be referred to generically as radiation gauges. In a beta ray gauge, an isotope such as Krypton 85, strontium 90 or carbon 15 emits a ray which is directed toward and received by an electron collector such as an ionization chamber, a Geiger-Muller tube or a scintillation detector. The intensity of the ray is sensed by the electron collector which emits a signal which can be amplified and displayed on an electromagnetic device such as a cathode ray tube or potentiometer recorder or fed to a computer for analysis and subsequent display. The radioactive source and the collector are mounted in heads which in turn are mounted for movement back and forth across and on opposite sides of a running film the thickness of which is to be measured. The film attenuates and scatters the rays in such a way that the output from the collector changes with variations in film thickness. These changes in the output from the collector are measured and traced on a chart. The gauge measures thickness as a function of weight per unit area and in order to get the proper sensitivity of the output relative to the variation of film thickness, the electronic amplification is of such magnitude that it is necessary to suppress the zero and have an output which has various ranges. For example, a full range of an output display device might be equivalent of a film weight of 20 grams per square meter while the films being measured have ranges from 20 to 100 g/m². Through an electronic means, the output of the recording devices is suppressed into a series of ranges, for example, 15 to 35 g/m², 25 to 45 g/m², 35 to 55 g/m², etc. A single thickness of a sheet having a deviation of 1 g/m² will show on a chart having a range of 20 g/m² as a deviation of 5 units in 100.

The present invention provides for putting a transverse fold in the running film and directing a double thickness of film between the heads of the gauge. In this manner, a deviation of 1 g/m² in a band running longitudinally of the film is detected as double that or as a deviation of 2 g/m² which shows up on the chart as 10 units in 100. That is, the effective sensitivity of the gauge to transverse thickness variation is doubled. In the normal use of a beta ray gauge or any of the other mentioned gauges, the speed of the film and the traverse rate of the gauge heads cause any longitudinal thickness variations to be super-imposed upon variations that exist in the transverse profile of the film. By putting a transverse fold in the film, it is possible to adjust the location of the fold so that at the point where a double layer of film is aligned with the gauge heads, one of the film layers will be characterized by one of the previously mentioned regularly occurring thin areas and the other layer will have one of the regularly occurring thick areas. Thus, the longitudinal thickness variations will cancel out and not affect the gauge reading.

It is therefore an object of this invention to provide a method and apparatus increasing the utility of a radiation gauge for measuring the transverse thickness profile of a running sheet.

It is a further object of the invention to provide an apparatus for selectively directing either of a pair of simultaneously cast and running sheets through a path traversed by a pair of spaced heads of a radiation gauge whereby one pair of gauge heads may be used for monitoring both sheets.

These and other objects, features and advantages of the invention as well as the means for attaining the same will be explained as the description of a preferred embodiment proceeds. Referring now to the drawings:

FIG. 1 is a side elevational view of an apparatus made in accordance with the present invention;

FIG. 2 is a plan view of the apparatus;

FIG. 3 is a side elevational view of a portion of the apparatus showing certain of the parts in an alternate position;

FIG. 4 is a section taken on line IV—IV of FIG. 1;

FIG. 5 is a section taken on line V—V of FIG. 1; and

FIG. 6 is a section taken on line VI—VI of FIG. 3.

The two sheets, the thicknesses of which are to be monitored, are indicated at 10 and 12. By way of example, the sheets may be considered to be newly formed regenerated cellulose films simultaneously cast in the manner described in the above referred to Reichel et al. U.S. Pat. No. 2,862,245. The two films pass face to face about a portion of a dryer drum 14 and then separate with film 10 moving to an idler roll 16 and film 12 being directed about a portion of a dryer drum 18 before proceeding to an idler roll 20. Dryer drums 14 and 18 are the last of a series of a large number of dryer drums as described in the said Reichel et al patent and after leaving the dryer drums the films are wound into separate rolls by a mechanism not herein shown.

In accordance with the present invention, the two films take selectively alternating paths as they proceed from the dryer drums to the windup mechanism. FIG. 1 shows each film in one of its alternate paths and FIG. 3 shows the films in their other alternate paths. Referring first to FIG. 1, film 10 proceeds from idler roll 16 part way about a freely rotatable roller 22 and thence horizontally to a roller 24 from which it extends to and more than 180° about a freely rotatable roller 26. Roller 26 directs the film to double back or fold upon itself and pass in contact with the lower portions of a pair of spaced rollers 28 and 30 so as to provide closely spaced parallel runs 10' and 10" of the film. From roller 30, film 10 proceeds about suitable guide rollers 32, 34 and 36 and thence to the windup, not shown. When film 10 takes the just described path, film 12 is laced in contact with guide rollers 38, 40 and 42 and thence to the windup, not shown.

A pair of spaced elements or heads 44 and 46 of a radiation gauge are suitably mounted in a manner not of the essence of the present invention but by way of example as by means respectively of a pair of guide bars 48 and 49 and a pair of guide bars 52 and 54 for selectively traversing back and forth across and on opposite sides of the oppositely moving runs 10' and 10" of the film. As previously indicated, the radiation gauge may be any one of several specific types with one of the heads containing a radiation source and the other housing a suitable radiation collector which emits a signal varying with the thickness of the film passing between the two heads. As shown in FIG. 2, head 44 (and also head 46 although not shown in this figure) is movable to a position entirely out of vertical alignment with film 10.

For reasons prestly to appear, rollers 22 and 30 are mounted for movement between closely adjacent positions shown in FIGS. 1 and 3 and more widely spaced positions as shown in FIG. 4. To this end, roller 30 has axial shaft portions mounted in bearing devices 56 and 58, see FIG. 4. Bearing devices 56 has a portion through which is threaded a shaft 60 and bearing devices 58 has a portion drivingly engaged with a threaded shaft 62. Shafts 60 and 62 have threads of opposite hand on opposite ends and roller 22 is mounted in bearing devices 64 and 66 drivingly engaged with the second set of threads of said shafts. Shaft 60 is rotatable in bearings 65 and 67 secured to the machine framework and has secured to the lower end thereof a bevel gear 68 meshed with a bevel gear 70 secured to one end of a shaft 72. Shaft 62 is rotatable in bearing devices 74 and 76 and has secured to the lower end thereof a bevel gear 78 meshed with a bevel gear 80 secured on shaft 72. A sprocket 82 is keyed on shaft 72 and a roller chain 84 is engaged with the sprocket for selectively rotating shaft 72 in opposite directions. The threads of shafts 60 and 62 are reversed; that is to say, the threads at the upper ends of the two shafts are of reversed hand, as are the threads at the lower ends of said shafts. With this arrangement, rotation of shaft 72 in one direction causes rollers 22 and 30 to move apart and rotation of said shaft in the opposite direction cause the rollers to move closer together.

Rollers 24 and 28 are mounted for movement toward and away from one another in the same manner as above described in connection with rollers 22 and 30. It is not believed necessary to repeat the details but it is noted that threaded shafts corresponding to shafts 60 and 62 are geared to a shaft 86, see FIG. 2, corresponding to shaft 72. The roller chain 84 engages a sprocket 88 keyed to shaft 86 whereby shafts 72 and 86 rotate in unison. A sprocket 90 secured to shaft 86 is connected by a roller chain 92 to a sprocket on the drive shaft 94 of a speed reduction unit 96 driven by a reversible motor 98. Thus, from any desired location an operator may start motor 98 to turn in the direction to simultaneously move the two sets of rollers 22, 30 and 24, 28 toward or away from each other.

The roller 26 is mounted in a carriage generally designated 100 and which as best shown in FIG. 2 comprises side frame members 102 and 104 and cross members 106 and 108. Also mounted in carriage 100 spaced from and parallel to roller 26 is a freely rotatable roller 110. The carriage is selectively movable between the position shown in full lines in FIG. 1 and the position shown in dotted lines in said figure, both of these positions being adjustable to a certain extend as will presently be described. When carriage 100 is in the full line position shown in FIG. 1, the film 10 is looped about roller 26 and is confined by the pairs of rollers 22, 30 and 24, 28 to provide the two runs 10' and 10'' to be traversed by the gauge heads 44 and 46. At this time, film 12 passes through carriage 100 between and out of contact with the rollers 26 and 110.

When it is desired to have the gauge monitor film 12 instead of film 10, the operator moves the rollers of the pairs 22, 30 and 24, 28 apart far enough so that carriage 100 may pass between them and then, in a manner presently to be described, causes the carriage to move to the left from the full line position of FIG. 1 to the dotted line position, this latter position being the one shown in full lines in FIG. 3. As the carriage moves leftward, roller 110 picks up film 12 to form a transversely extending fold in the moving film and when the carriage is in the full left position the operator causes the pairs of rollers 22, 30 and 24, 28 to be restored to the close together positions so as to provide as shown in FIG. 3 two closely spaced parallel runs 12' and 12'' of film lying in the path of traverse of the gauge heads 44 and 46. With carriage 100 in the left hand position, film 10 passes through the carriage between and out of contact with rollers 26 and 110.

When carriage 100 is in its right hand position, it is supported by a pair of arms 112 and 114 extending forward respectively from box channel members 116 and 118 and penetrating into the side frame members 102 and 104 of the carriage, members 102 and 104 being in the form of inwardly facing channels. Arms 112 and 114 are provided respectively with latches 120 and 122 which are spring urged upward to extend through aligned openings in the carriage side members 102 and 104 so as to hold the carriage in engagement with the arms. There is a solenoid, not shown, for retracting each latch from engagement with the carriage for a purpose presently to be explained.

Box channel member 116 is supported and guided for reciprocating movement by two pairs of upper and lower flanged guide wheels. One pair of the guide wheels is shown in FIG. 5, the upper wheel being designated 124 and the lower one 126. The upper wheel of the other pair of wheels is indicated in FIG. 2 at 128. Box channel member 118 is similarly supported for reciprocating movement by a first pair of upper and lower flanged wheels 130 and 132 and a second pair of wheels 134 and 136.

As shown in FIGS. 2 and 5, a rack 138 is secured to member 116 and a rack 140 is secured to member 118. Both racks have downwardly directed teeth which mesh respectively with pinions 142 and 144 secured to a cross shaft 146 rotatably mounted in the machine framework. Shaft 146 is connected through a speed reduction unit 148 to a reversible motor 150. From any suitable location, the operator can cause motor 150 to rotate in the direction to cause roller carriage 100 to move to or from the full line position of FIGS. 1 and 2.

For supporting roller carriage 100 in its left hand position, there is a pair of inwardly opening channel members 152 and 154 suitably fixed to the machine framework in alignment with the path of movement of the carriage. As shown in FIG. 6, channel members 152 and 154 are slightly larger and spaced somewhat farther apart than the side channel members of carriage 100 so that when the carriage is moved leftward from the full line position of FIG. 1 it will fit into the channel members 152 and 154. Box channel member 116 is provided with an upstanding cam 156 and as roller carriage 100 reaches approximately the desired left hand position said cam contacts a switch 158 wired in a circuit with the motor 148. When switch 158 is tripped, the motor stops and carriage 100 comes to rest.

For the reason previously explained, the exact position of carriage 100 during monitoring of either film must be adjustable and as mentioned above switch 158 is effective to define only the approximately left hand parking position. In order to permit adjustment of this parking position, the following mechanism is provided, see particularly FIGS. 1 and 6. Rotatably mounted in bearings 160 and 162 secured to the bottom flanges of channels 152 and 154 respectively is a shaft 164 to which is keyed or otherwise secured a pair of pinions 166 and 168. As carriage 100 approaches the left hand parking position, a pair of racks 170 and 172 secured respectively to the bottom flanges of channel member 102 and 104 of the carriage move into driving engagement with pinions 166 and 168 respectively. Also secured to shaft 164 is a pinion 174 which meshes with a rack 176 of a value positioner 178. During the last bit of leftward movement of the carriage, pinions 166 and 168 cause shaft 164 to rotate in the direction which causes pinion 174 to move rack 176 toward the right against the action of valve positioner 178. When the carriage 100 reaches the position defined by switch 158, the operator energizes the solenoids for retracting latch members 120 and 122 and starts motor 148 to turn in the direction to drive box channels 116 and 118 and arms 112 and 114 carried thereby back to the right hand position. Engagement of racks 170 and 172 with the pinions 166 and 168 and of pinion 174 with the rack 176 of valve positioner 178 holds carriage 100 stationary as arms 112 and 114 slide out of engagement with the channel members 102 and 104 of the carriage. After box channels 116 and 118 have been fully restored to the right hand position and the pairs of rollers 22, 30 and 24, 28 have been restored to their close together positions as shown in FIG. 1, the operator adjusts valve positioner 178 to cause the rack and pinion drive train 170, 172 166, 174 and 176 to move carriage 100 in one direction or the other to the point where roller 110 puts the proper length of film between where runs 12' and 12'' are traversed by the measuring head so that one of the runs has a transversely extended thick portion in line with the traverse of the gauge and the other run has a transversely extending thin portion. For reasons presently to become apparent, valve positioned 178 is operatively connected with a valve positioner 180 for switch 158 so that switch 158 stays in the same position relative to carriage 100 as the latter is moved by valve positioner 178.

When carriage 100 is to be restored from the FIG. 3 position wherein film 12 is being monitored to the full line position of FIG. 1 for monitoring the film 10, the following procedure is employed. The roller pairs 22, 30 and 24, 28 are moved to their spaced apart positions shown in FIG. 4 and motor 148 is started to drive box channels 116 and 118 toward the left. As said channels approach the left hand position, the arms 112 and 114 extending therefrom enter into the side channels 102 and 104 respectively of carriage 100 and as cam 156 trips switch 158 to stop the motor 148 as aforesaid the spring urged latches 120 and 122 snap into the openings provided therefor in the top flanges of channel members 102 and 104. The operator then starts motor 148 to turn in the opposite direction and because of the latches 120 and 122 the carriage 100 is picked up and moved to the right. As the carriage reaches the right hand position required to put the desired total length of film between the lines where runs 10' and 10'' of the film are traversed by the measuring head, a cam 182 extending upward from box channel 118 engages a switch 184. Switch 184 is adjustably positionable by a valve positioner 186 which in turn is adjusted in any desired manner.

It will be apparent that the invention is not limited to the particular mechanisms described above in detail and that a variety of equivalent mechanisms may be employed and will fall within the scope of the following claims.

What is claimed is:

1. A method of using a radiation gauge for measuring transverse thickness variations in running sheet comprising traversing the gauge having a radiation detector spaced from a radiation source along a path extending transversely of and in thickness measuring proximity to the running sheet, and directing a multiple thickness of the sheet between the radiation detector and the radiation source of the gauge across the path traversed by the gauge, the multiple thickness of the sheet increasing the sensitivity of the gauge to transverse thickness variations of the sheet.

2. The method set forth in claim 1 including the step of providing the multiple thickness by putting a transverse fold in the sheet and doubling the sheet upon itself as it moves across the path traversed by the gauge.

3. The method set forth in claim 2 comprising the step of adjusting the position of the fold in relation to the path traversed by the gauge so that regularly longitudinally occurring thick and thin areas of the sheet will be aligned with one another in the path traversed by the gauge whereby overall longitudinal thickness variations sensed by the gauge will be diminished.

4. Apparatus for measuring transverse thickness variations in a running sheet comprising a gauge having a radiation source and a detector, means guiding the radiation source and the detector spaced apart through a predetermined path and for moving them back and forth along the path, and means for guiding a multiple thickness of the sheet across said path and between the radiation source and the detector.

5. The apparatus set forth in claim 4 wherein said last mentioned means comprises a roller movable to engage said sheet and divert it from a straight line path into a loop, means to flatten said loop to provide two closely spaced runs of the sheet passing across the path traversed by and between the radiation source and the detector.

6. The apparatus set forth in claim 5 comprising means for adjustably positioning said roller so as to provide a selectively variable desired length of sheet in the loop between the two points where the sheet crosses the path traversed by the radiation source and the detector.

7. Apparatus for selectively testing a physical property of either one of a pair of simultaneously running sheets comprising a first pair of guide rolls for periodically directing the first one of the sheets along a predetermined path through a portion of its travel, a second pair of guide rolls for periodically directing the second sheet along a predetermined path through a portion of its travel, the predetermined paths of said sheets being so related that if the sheets were running simultaneously through the predetermined paths they would be spaced apart in face-to-face relationship, a physical property measuring instrument comprising relatively narrowly spaced elements movable back and forth transversely of the width of the films between the said predetermined paths, means for periodically directing the first film out of its said predetermined path and into a relatively flat loop extending toward the predetermined path of the second film and across a path traversed by the instrument as it moves back and forth whereby the said instrument may measure a physical property of the first film as said instrument moves back and forth, means for selectively eliminating the loop and returning the first film to its said predetermined path and simultaneously directing the second film out of its said predetermined path and into a relatively flat loop a portion of which occupies the same territory previously occupied by a portion of the flat loop of the first film, whereby the said instrument may measure a physical property of the second film as said instrument moves back and forth, the one instrument thus being used to measure the same physical property of both films without the necessity of relocating said instrument.

8. The apparatus set forth in claim 7 wherein the means for selectively directing the first film out of its said predetermined path and the means for periodically directing the second film out of its said predetermined path comprises a pair of rollers and a carriage supporting said rollers, means for selectively moving said carriage from a position on one side of the path traversed by said instrument to the other side of said path and vice versa, one of said rollers being the means for directing the first film out of its said predetermined path and the other roller being the means for directing the second films out of its said predetermined path.

* * * * *

UNITED STATES PATENT OFFICE
CERTIFICATE OF CORRECTION

PATENT NO. : 3,860,820
DATED : January 14, 1975
INVENTOR(S) : Daniel J. Ryan

It is certified that error appears in the above-identified patent and that said Letters Patent are hereby corrected as shown below:

In the abstract, line 5, change "film" to read --machine--;
                   line 8, change "film" to read --machine--;
                   line 9, change "film" to read --machine--;
                   line 11, change "film" to read --machine--;
                   line 11, before the period, insert --so that the gauge reading changes only with variations in the transverse thickness profile of the film.--

Col. 2, line 57, "devices" should read --device--.
Col. 4, line 26, "devices" should read --device--;
       line 46, "cause" should read --causes--.
Col. 6, line 26, "value" should read --valve--;
       line 47, after "166," insert --168.--.

Signed and Sealed this ninth Day of September 1975

[SEAL]

Attest:

RUTH C. MASON
*Attesting Officer*

C. MARSHALL DANN
*Commissioner of Patents and Trademarks*